(12) United States Patent
Djordjevic et al.

(10) Patent No.: US 9,015,035 B2
(45) Date of Patent: Apr. 21, 2015

(54) USER MODIFICATION OF GENERATIVE MODEL FOR DETERMINING TOPICS AND SENTIMENTS

(75) Inventors: Divna Djordjevic, Antibes (FR); Rayid Ghani, Chicago, IL (US); Marko Krema, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 371 days.

(21) Appl. No.: 13/545,363

(22) Filed: Jul. 10, 2012

(65) Prior Publication Data

US 2013/0018651 A1    Jan. 17, 2013

(30) Foreign Application Priority Data

Jul. 11, 2011    (EP) ..................................... 11305901

(51) Int. Cl.
| | |
|---|---|
| *G06F 17/21* | (2006.01) |
| *G06F 17/30* | (2006.01) |
| *G06F 17/27* | (2006.01) |
| *G06Q 10/00* | (2012.01) |

(52) U.S. Cl.
CPC ............ *G06F 17/2765* (2013.01); *G06Q 10/00* (2013.01)

(58) Field of Classification Search
CPC ... G06F 17/21; G06F 17/2785; G06F 17/279; G06F 17/30
USPC ............ 704/1, 9, 10; 707/737, 738, 739, 776; 706/12
See application file for complete search history.

(56) References Cited

U.S. PATENT DOCUMENTS

| | | | |
|---|---|---|---|
| 5,146,405 A | 9/1992 | Church | |
| 8,010,524 B2 * | 8/2011 | Chen et al. | 707/722 |
| 8,027,941 B2 * | 9/2011 | Probst et al. | 706/14 |
| 8,189,930 B2 * | 5/2012 | Renders et al. | 382/228 |
| 8,538,739 B2 * | 9/2013 | Woodbury | 703/17 |
| 8,620,837 B2 * | 12/2013 | Ghani et al. | 706/12 |
| 8,650,143 B2 * | 2/2014 | Fano et al. | 706/46 |
| 8,676,730 B2 * | 3/2014 | Ghani et al. | 706/12 |
| 2003/0187702 A1 | 10/2003 | Bonissone et al. | |
| 2006/0229854 A1 * | 10/2006 | Grichnik et al. | 703/2 |
| 2007/0124432 A1 * | 5/2007 | Holtzman et al. | 709/219 |
| 2009/0119275 A1 * | 5/2009 | Chen et al. | 707/5 |
| 2009/0319342 A1 * | 12/2009 | Shilman et al. | 705/10 |
| 2010/0280985 A1 * | 11/2010 | Duchon et al. | 706/52 |
| 2010/0306123 A1 * | 12/2010 | Cai et al. | 705/347 |

(Continued)

OTHER PUBLICATIONS

Search Report issued in EP 11305901.8 on Jan. 2, 2012.

(Continued)

*Primary Examiner* — Martin Lerner
(74) *Attorney, Agent, or Firm* — Harrity & Harrity, LLP (57) ABSTRACT

A generative model is used to develop at least one topic model and at least one sentiment model for a body of text. The at least one topic model is displayed such that, in response, a user may provide user input indicating modifications to the at least one topic model. Based on the received user input, the generative model is used to provide at least one updated topic model and at least one updated sentiment model based on the user input. Thereafter, the at least one updated topic model may again be displayed in order to solicit further user input, which further input is then used to once again update the models. The at least one updated topic model and the at least one updated sentiment model may be employed to analyze target text in order to identify topics and associated sentiments therein.

22 Claims, 4 Drawing Sheets

(56) References Cited

U.S. PATENT DOCUMENTS

| | | | |
|---|---|---|---|
| 2011/0202555 A1* | 8/2011 | Cordover et al. | 707/769 |
| 2011/0208522 A1* | 8/2011 | Pereg et al. | 704/235 |
| 2011/0264678 A1* | 10/2011 | Mital et al. | 707/759 |
| 2012/0310996 A1 | 12/2012 | Kulack et al. | |
| 2013/0018824 A1 | 1/2013 | Ghani et al. | |
| 2013/0018825 A1 | 1/2013 | Ghani et al. | |
| 2013/0325992 A1* | 12/2013 | McGann et al. | 709/206 |

OTHER PUBLICATIONS

Qiaozhu Mei, et al.: "Topic Sentiment Mixture: Modeling Facets and Opinions in Weblogs", WWW 2007/Track: Data Mining, May 12, 2007, pp. 171-180, XP55015419.

Lin, C., and He, Y., "Joint Sentiment/Topic Model for Sentiment Analysis", CIKM '09, Nov. 2-6, 2009, Hong Kong, China.

Wang, "Sentiment Analysis of Online Product Reviews with Semi-supervised Topic Sentiment Mixture Model", 2010 Seventh International Conference on Fuzzy Systems and Knowledge Discovery (FSKD 2010), IEEE, pp. 2385-2389 (2010).

Breese et al., "Decision—Theoretic Case-Based Reasoning", IEEE Transactions on Systems, vol. 26, No. 6, pp. 838-842 (1996).

Cao, "Model Selection Based on Expected Squares Hellinger Distance", ProQuest Dissertation and Theses, 2007, 4 pages.

Smyth et al., "Hierarchical Case-Based Reasoning Integrating Case-Based and Decompositional Problem-Solving Techniques for Plant-Control Software Design", IEEE Transactions on Knowledge and Data Engineering, vol. 13, No. 5, pp. 793-812 (2001).

\* cited by examiner

| TOPIC | WORD | PROB. | TOPIC | WORD | PROB. | TOPIC | WORD | PROB. |
|---|---|---|---|---|---|---|---|---|
| 0 | performance | 1.0 | 1 | fuel | 0.5 | 2 | interior | 0.5 |
|   |   |   | 1 | economy | 0.5 | 2 | design | 0.5 |

FIG. 5 (500):

| TOPIC | WORD | PROB. | TOPIC | WORD | PROB. | TOPIC | WORD | PROB. |
|---|---|---|---|---|---|---|---|---|
| 0 | performance | 0.8562133 | 1 | fuel | 0.5178794 | 2 | interior | 0.7115677 |
| 0 | orient | 0.0056987 | 1 | economy | 0.1982355 | 2 | plastic | 0.1081447 |
| 0 | stellar | 0.0055489 | 1 | efficient | 0.0863782 | 2 | design | 0.0927193 |
| 0 | optimum | 0.0045721 | 1 | consumption | 0.0853179 | 2 | spacious | 0.0082147 |
| 0 | reliability | 0.0041682 | 1 | inject | 0.0754138 | 2 | material | 0.0085247 |
| 0 | steering | 0.0039872 | 1 | maximize | 0.0081234 | 2 | layout | 0.0067415 |
| 0 | great | 0.0035871 | 1 | conserve | 0.0006124 | 2 | cloth | 0.0055158 |

502 = topic 0 group; 504 = topic 1 group; 506 = topic 2 group

FIG. 6

| TOPIC | WORD | PROB. | TOPIC | WORD | PROB. | TOPIC | WORD | PROB. |
|---|---|---|---|---|---|---|---|---|
| 0 | performance | 0.8562133 | 1 | fuel | 0.5178794 | 2 | interior | 0.7115677 |
| 0 | orient | 0.0056987 | 1 | economy | 0.1982355 | 2 | plastic | 0.1081447 |
| 0 |  |  | 1 | efficient | 0.0863782 | 2 |  |  |
| 0 | optimum | 0.0045721 | 1 | consumption | 0.0853179 | 2 | spacious | 0.0082147 |
| 0 | reliability | 0.0041682 | 1 | inject | 0.090000 | 2 | material | 0.0085247 |
| 0 | steering | 0.0039872 | 1 | maximize | 0.0081234 | 2 | layout | 0.0067415 |
| 0 | design | 0.0927193 | 1 | conserve | 0.0006124 | 2 | cloth | 0.0055158 |

| SENTENCE | TOPIC | PROB. |
|---|---|---|
| I've driven it in Blizzards, on the beach, off-road and plenty on-road. | 18 | 0.999969 |
| It hauls more than enough for most weekend warriors, and gets me in and out of the back . . . | 9 | 0.785504 |
| Smooth and quiet for a truck. | 15 | 0.823638 |
| Toyota just does not have the quality construction it once did. | 6 | 0.999988 |
| My bottom line was 16,000 with tax/tags out the door. | 12 | 0.999996 |
| We get 39 mpg with this one. | 1 | 0.999997 |
| Dependable and enjoyable to drive. | 3 | 0.986347 |
| My first was a 99 w/ 4cyl and stick in white diamond pearl with cloth oak interior. | 2 | 0.737223 |
| Toyota did an amazing job with this design. | 5 | 0.625903 |
| I extensively drove the competition over 4 months, but none could hold a candle to the 4R . . . | 18 | 0.999927 |

← 700

USER MODIFICATION OF GENERATIVE MODEL FOR DETERMINING TOPICS AND SENTIMENTS

CROSS-REFERENCE TO RELATED APPLICATION

The instant application is related to applications entitled "Sentiment Classifier Based On Feature Extraction", U.S. patent application Ser. No. 13/179,707 (now U.S. Pat. No. 8,676,730), and "Determination Of A Basis For A New Domain Model Based On A Plurality Of Learned Models", U.S. patent application Ser. No. 13/179,741 (now U.S. Pat. No. 8,620,837), both filed on Jul. 11, 2011, the teachings of which are incorporated herein by this reference.

FIELD

The instant disclosure relates generally to systems incorporating generative models that may be used to jointly discover topics and sentiment in a body of text and, in particular, to the provision of user input in such systems.

BACKGROUND

Both topic detection and sentiment detection within a body of text (which may comprise one or more text documents in virtually any form) are known in the art. Typically, certain algorithms, such as clustering, are used to analyze the body of text in order to detect topics within the body of text. Thereafter, as a separate step, sentiment analysis may be performed on those portions of the body of text (i.e., certain documents) deemed to correspond to each of the detected topics. In this manner, such techniques have been employed to determine sentiment about certain topics encompassed by the body of text.

While such an approach may be useful, in reality, topics and sentiment in a body of text are usually highly correlated. Sentiment polarities (e.g., "like"/"dislike", "good"/"bad", "for"/"against", etc.) are dependent on topics or domains meaning that the same word may have different sentiment polarities in different domains. To address this, techniques that permit the joint determination of topics and sentiments have been developed including, for example, extension of methods for standard topic modeling such as the well-known probabilistic Latent Semantic Analysis (PLSA) and Latent Dirichlet Allocation (LDA). Simply put, methods such as PLSA and LDA view an item of text as a mixture of global topic models. An example of an extension of PLSA may be found in Mei et al., "Topic Sentiment Mixture: Modeling Facets and Opinions in Weblogs", Proceedings of the 16th International Conference on World Wide Web (WWW 2007), p. 171-189 ("the Mei Paper"), which describes usage of an extra background component and two additional sentiment subtopics to jointly model a mixture of topics and sentiment predictions for each item (document) in a body of text. In particular, the Mei Paper, the teachings of which are incorporated herein by this reference, teaches a generative model whereby sentiment models (i.e., either positive or negative) are determined independently of, but simultaneously with, one or more topic models based on training text. Thereafter, the resulting sentiment and topic models may be applied to targeted text to detect the existence of further topics, and their respective sentiments, within the targeted text. An example of another extension, in this case, of the LDA technique is described by C. Lin and Y. He, "Joint sentiment/topic model for sentiment analysis", Proceedings of the ACM international conference on Information and knowledge management (CIKM) 2009 ("the Lin Paper"), the teachings of which are incorporated herein by this reference, in which it is proposed to add a sentiment layer.

While topic and sentiment modeling techniques are useful, the training text often required to develop acceptable performance and reliable topic and sentiment models may be relatively scarce or non-trivial to obtain.

SUMMARY

The instant disclosure describes techniques for incorporating user input when developing topic and sentiment models. In an embodiment, a generative model is used to develop at least one topic model and at least one sentiment model for a body of text. Thereafter, the at least one topic model is displayed such that, in response, a user may provide user input indicating modifications to the at least one topic model. By way of non-limiting example, the modifications may comprise merging of two or more topics modeled by the at least one topic model, division of a single topic into two or more separate topics, modification of a word probability within a topic, deletion of a word probability within a topic or movement of a word probability from one topic to another. Based on the received user input, the generative model is used to provide at least one updated topic model and at least one updated sentiment model based on the user input. In another embodiment, the user input serves as the basis for initiating the topic/sentiment models. In this manner, user input may be employed to augment models developed according to relatively scarce training text, or to initiate models on the basis of the user input only. Thereafter, the at least one updated topic model may again be displayed in order to solicit further user input, which further input is then used to once again update the models. This cycle may be repeated as many times as desired. The at least one updated topic model and the at least one updated sentiment model may be employed to analyze the body of text in order to identify topics and associated sentiments therein.

By permitting user input data to initiate or modify topic and/or sentiment models in this manner, the amount of processing required to arrive at the final models can be reduced. That is, the user's expert acumen can be more readily incorporated into the model and permit quicker convergence to final models, thereby avoiding the use of processing resources that may have been otherwise expended in developing a given model. Because the final models thus produced permit the analysis of the body of text, the amount of processing resources needed to analyze the body of text is consequently reduced.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Figure 1:
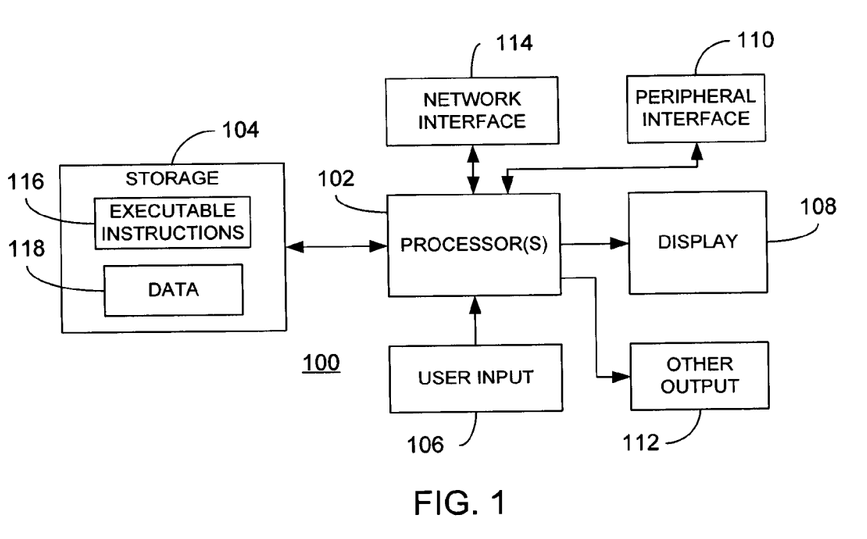
FIG. 1 is a block diagram of a processing device that may be used to implement various embodiments in accordance with the instant disclosure.

FIG. 1 illustrates a representative processing device 100 that may be used to implement the teachings of the instant disclosure. The device 100 may be used to implement, for example, the processing illustrated below with regard to FIG. 3 and/or to implement one or more components of the apparatus 200 illustrated in FIG. 2 or the interfaces illustrated in FIGS. 4-7, as described in greater detail below. Regardless, the processing device 100 includes a processor 102 coupled to a storage component 104. The storage component 104, in turn, includes stored executable instructions 116 and data 118. In an embodiment, the processor 102 may include one or more processing devices such as a microprocessor, microcontroller, digital signal processor, or combinations thereof capable of executing the stored instructions 116 and operating upon the stored data 118. Likewise, the storage component 104 may include one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, etc. Processor and storage arrangements of the types illustrated in FIG. 1 are well known to those having ordinary skill in the art, for example, in the form of laptop, desktop, tablet, or server computers. In one embodiment, the processing techniques described herein are implemented as a combination of executable instructions and data within the storage component 104.

As shown, the processing device 100 may include one or more user input devices 106, a display 108, a peripheral interface 110, other output devices 112, and a network interface 114 in communication with the processor 102. The user input device 106 may include any mechanism for providing user input to the processor 102. For example, the user input device 106 may include a keyboard, a mouse, a touch screen, microphone, and suitable voice recognition application or any other means, whereby a user of the processing device 100 may provide input data to the processor 102. The display 108 may include any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices, or any other input source used in connection with the instant techniques. Likewise, the other output device(s) 112 may optionally include similar media drive mechanisms, other processing devices, or other output destinations capable of providing information to a user of the processing device 100, such as speakers, LEDs, tactile outputs, etc. Finally, the network interface 114 may include hardware, firmware, and/or software that allows the processor 102 to communicate with other devices via wired or wireless networks, whether local or wide area, private or public, as known in the art. For example, such networks may include the World Wide Web or Internet, or private enterprise networks, as known in the art.

While the processing device 100 is a form for implementing the various embodiments described herein, those having ordinary skill in the art will appreciate that other, functionally equivalent techniques may be employed. For example, rather than using a single processing device 100, the functionality described herein may be separated over multiple processing devices. Furthermore, as known in the art, some or all of the functionalities implemented via executable instructions may also be implemented using firmware and/or hardware devices such as application specific integrated circuits (ASICs), programmable logic arrays, state machines, etc. Further still, other implementations of the processing device 100 may include a greater or lesser number of components than those illustrated. Once again, those of ordinary skill in the art will appreciate the wide number of variations that may be used is this manner.

Figure 2:
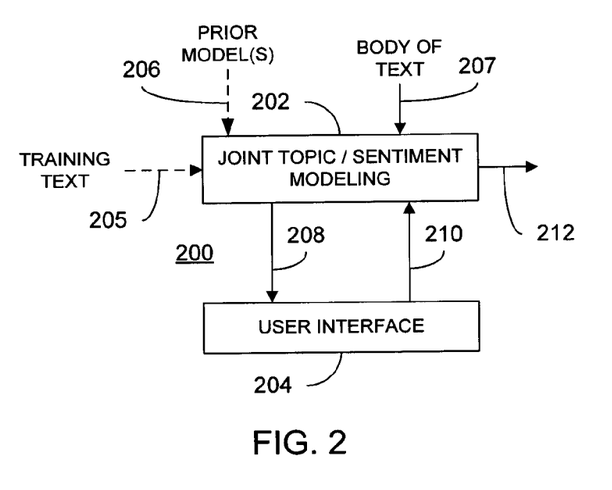
FIG. 2 is a block diagram of an apparatus for providing user input to a system for joint discovering topics and sentiment in accordance with an embodiment of the instant disclosure.

Referring now to FIG. 2, an apparatus 200 comprising a joint topic/sentiment modeling component 202 is illustrated. As shown, the joint topic/sentiment modeling component 202 is operatively connected to a user interface component 204. As noted above, the apparatus 200 may be implemented using the processing device 100 illustrated in FIG. 1. However, once again, other implementations may be equally employed. The joint topic/sentiment modeling component 202 may be optionally provided with training text 205 as input (as illustrated by the dashed arrow). As used herein, training text 205 may comprise any compilation of text-based data of varying sizes from virtually any source, e.g., Word documents, plain text files, hypertext markup language (HTML) encoded text, etc. For example, the training text 205 may comprise documents, etc. each having associated therewith a topic label and a sentiment label. As described below, the training text 205, when available, may be used to create topic/sentiment models that may be subsequently modified by a user of the apparatus 200. However, as noted above, such training text 205 may not always be readily available for a given domain. As an alternative, one or more prior models 206 may also be optionally provided to the joint topic/sentiment modeling component 202, which models may be subsequently modified as desired by the user. Further still, the joint topic/sentiment modeling component 202 may operate without the benefit of either the training text 205 and/or prior model(s) 206. In this case, as described below, a user may directly provide input that permits the creation of the desired topic and sentiment models.

In an embodiment, the joint topic/sentiment modeling component 202 implements a generative model to jointly develop topic and sentiment models based on any input used to initiate the models (e.g., the training text 205, prior model(s) 206 and/or user input) as well as a body of text 207, which may likewise comprise any type of text-based data similar to the training text 205 described above. As used herein, a topic is a set of semantically coherent words or phrases (referred to generally as features) within the body of text (or subsets thereof, e.g., individual documents) whereas a sentiment is a set of words or phrases representing an opinion about a topic. Topic and sentiment models, in turn, express the conditional likelihood of a given topic/sentiment for individual text features. While the instant description refers to various embodiments of specific generative models, the instant disclosure is not so limited. Generally, the techniques described herein may be applied to any system using generative models to represent documents as a mixture of topics and sentiments, and for the determination of topic and/or sentiment models expressed as conditional probabilities. For example, the techniques taught herein may be equally applied to the various extensions of PLSA and LDA as described, for example, in the Mei Paper.

As known in the art, a generative model can be used in machine learning to model observed data directly based on draws from a probability density function. Stated another way, a generative model models observations (e.g., words in a document) as the outcome of a number of hidden random variables having a joint probability distribution, each of which may be estimated. For example, as set forth in the Mei Paper, in the case of documents comprising words, a word w is sampled from either from a background component model or topic themes. In turn, a word from a given topic theme is sampled from either a positive sentiment model, a negative sentiment model or a neutral (topic) sentiment model. Alternatively, as set forth in the Lin Paper a word in each document is sampled from a joint topic-sentiment distribution, where topics are generated dependent on sentiment distributions.

More formally, as set forth for PLSA, a document corpus or body of text comprises a collection of m documents D= $\{d_1, \ldots, d_m\}$; a document is a sequence of words from vocabulary V; and topic models are represented as k topic models $\Theta = \{\theta_1, \ldots, \theta_k\}$ that capture neutral descriptions about topics appearing in the document collection. A word w in document d is sampled from the following joint probability model defined by the mixture:

$$p(w,d) = p(d) \Sigma_{j=1}^{k} p(w|\theta_j) p(\theta_j|d) \quad (1)$$

where $p(\theta_j|d)$ is the probability of choosing the j-th topic in document d and serves as a mixing weight for topics, and where p(d) is the probability of a document d that can be directly obtained from the word content of the document and the vocabulary V. In the Mei Paper, an extension to this standard approach that covers the joint topic-sentiment modeling assumes that a word either comes from a background model $\theta_B$ of common topic, non-discriminative words or from one of the subtopics described with positive sentiment model $\theta_P$, negative sentiment model $\theta_N$ or one of the neutral sentiment models $\theta_j$. Furthermore, additional mixing coefficients $\{\delta_{d,j,F}, \delta_{d,j,P}, \delta_{d,j,N}\}$ for the subtopics define sentiment coverage of topic j in document d for neutral, positive and negative sentiment models and $\lambda_B$ is a coefficient indicating the level of "noise" (or background words that do not substantially contribute to topic or sentiment models) within the body of text. Given this representation, the joint distribution is now expressed as:

$$p(w,d) = \lambda_B p(w|\theta_B) + (1-\lambda_B) \Sigma_{j=1}^{k} p(\theta_j|d) [\delta_{d,j,F} p(w|\theta_j) + \delta_{d,j,P} p(w|\theta_P) + \delta_{d,j,N} p(w|\theta_N)] \quad (2)$$

In this case, then, the parameters that need to be estimated are the topics and sentiment models, the topic mixing weight $p(\theta_j|d)$ and the sentiment distribution of document d regarding topic j given by the neutral, positive and negative sentiment coverage. Additionally, in order to assure discrimination between sentiment and topic models, prior knowledge about the sentiment and/or topic priors are combined with the joint topic-sentiment model (as set forth in Equation (2) above) to estimate the parameters using the maximum a posteriori (MAP) estimator, as known in the art.

In another embodiment, as set forth for LDA, a body of text, documents and words selected from a vocabulary are defined as noted above. In this instance, documents are represented as random mixtures over latent topics and each topic is characterized as a distribution over words. The extension for joint topic-sentiment modeling described, for example, in the Lin Paper assumes that a word w from document d is generated by choosing a sentiment label l from a document-specific sentiment distribution p(l|d) and choosing a topic from a document-specific topic distribution conditioned on the sentiment label $p(\theta|l,d)$. Finally, a word is sampled from a word distribution defined by topic and sentiment labels $p(w|\theta,l)$. In this case, the joint probability of words and topic/sentiment labels is given as:

$$p(w,\theta,l) = p(w|\theta,l) p(\theta|l,d) p(l|d) \quad (3)$$

Gibbs Sampling, as known in the art, is used to approximate distribution of words in topics and sentiment labels, prediction of topic labels given sentiment labels of a document and prediction of sentiment label of a document. In this approach too, prior information can be utilized on the sentiment and topic models during the initialization step for Gibbs sampling, e.g. if there is a match between a word in the prior topic or sentiment model and a word from a document, the corresponding topic or sentiment label is assigned to the word.

Regardless of the technique used to model the mixture of sentiments and topics in the body of text and to develop the resulting topic and sentiment models, the sentiment and topic models can be initiated or modified in accordance with user input. To this end, and referring once again to FIG. 2, the user interface 204 receives display data 208 from the joint topic/sentiment modeling component 202. In particular, the display data 208 may comprise data illustrating the at least one topic model and, optionally, the at least one sentiment model. Further still, the display data 208 may comprise user input mechanisms that permit a user to input data representative of new topics and/or sentiments. The user interface 204 may be implemented using any known techniques in the art. For example, the display 108 illustrated in FIG. 1 may be used to visually display the display data 208. Likewise, the user input device 106 illustrated in FIG. 1 may be used to receive user input data 210 and provide it to the processor 102. As described in greater detail below, the user data 210 may reflect initial inputs for or modifications to the at least one topic model displayed as part of display data 208, examples of which are illustrated with reference to FIGS. 4-6. Techniques for generating display data to be displayed on a display are well known in the art and need not be described in further detail here.

Based on the user input data 210, the joint topic/sentiment modeling component 202 provides at least one updated topic model and at least one updated sentiment model 212, as described below. Although not illustrated in FIG. 2, the at least one updated topic model and the at least one updated sentiment model 212 may be stored in any suitable storage device for later use.

In an embodiment, user input influences the generation of topic/sentiment models (as described above) through the use of so-called priors. As known in Bayesian probability theory, if a posterior probability is in the same family as the prior probability the conjugate prior may be adapted as a prior of the targeted distribution. For example, Equation (2) above is expressed as a mixture of multinomial distributions and, as known in the art, the appropriate conjugate prior for a given topic $\theta_j$ is the Dirichlet prior expressed as, $D\{(1+\mu_j p(w|\overline{\theta}_j)_{w \in V}\}$, where $\mu_j$ is the confidence in the prior of the topic model. Likewise, conjugate priors may be developed for the positive and negative sentiment models. Since the prior is a conjugate and $\mu_j$ is the confidence in the prior, the impact of adding a prior, for example, to a given topic model would be equivalent to adding $\mu_j p(w|\overline{\theta}_j)$ pseudo counts for word w when estimating the topic model $p(w|\theta_j)$. Stated another way, a user's input $p(w|\theta_j)$ initially expresses or modifies an existing probability of a word w for a given topic j, which input may be weighted according to the confidence $\mu_j$ in that input, i.e., the word model of the body of text is modified according to the user input and then used as the starting point for estimating the parameters as described above. Various examples of how such user input may be obtained are described in greater detail below.

Figure 7:
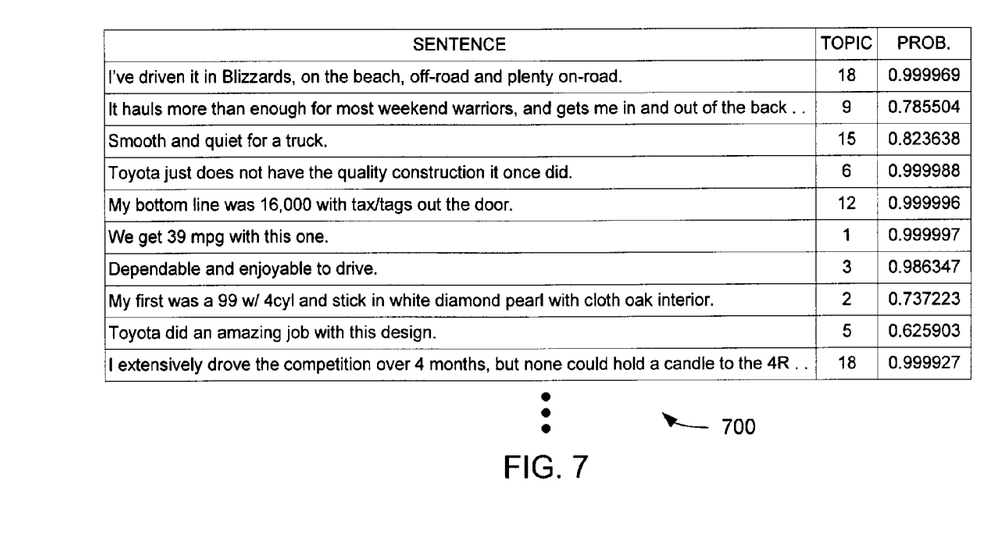
FIG. 7 illustrates an example of a user interface that may be used to present results of targeted text that has been analyzed according to at least one topic model provided in accordance with various embodiments of the instant disclosure.

The resulting topic and sentiment probabilities 212 may be provided to a suitable display device or other output device for use by a user thereof. Once again, an example of this is illustrated in FIG. 7 and is described in greater detail below.

Figure 3:
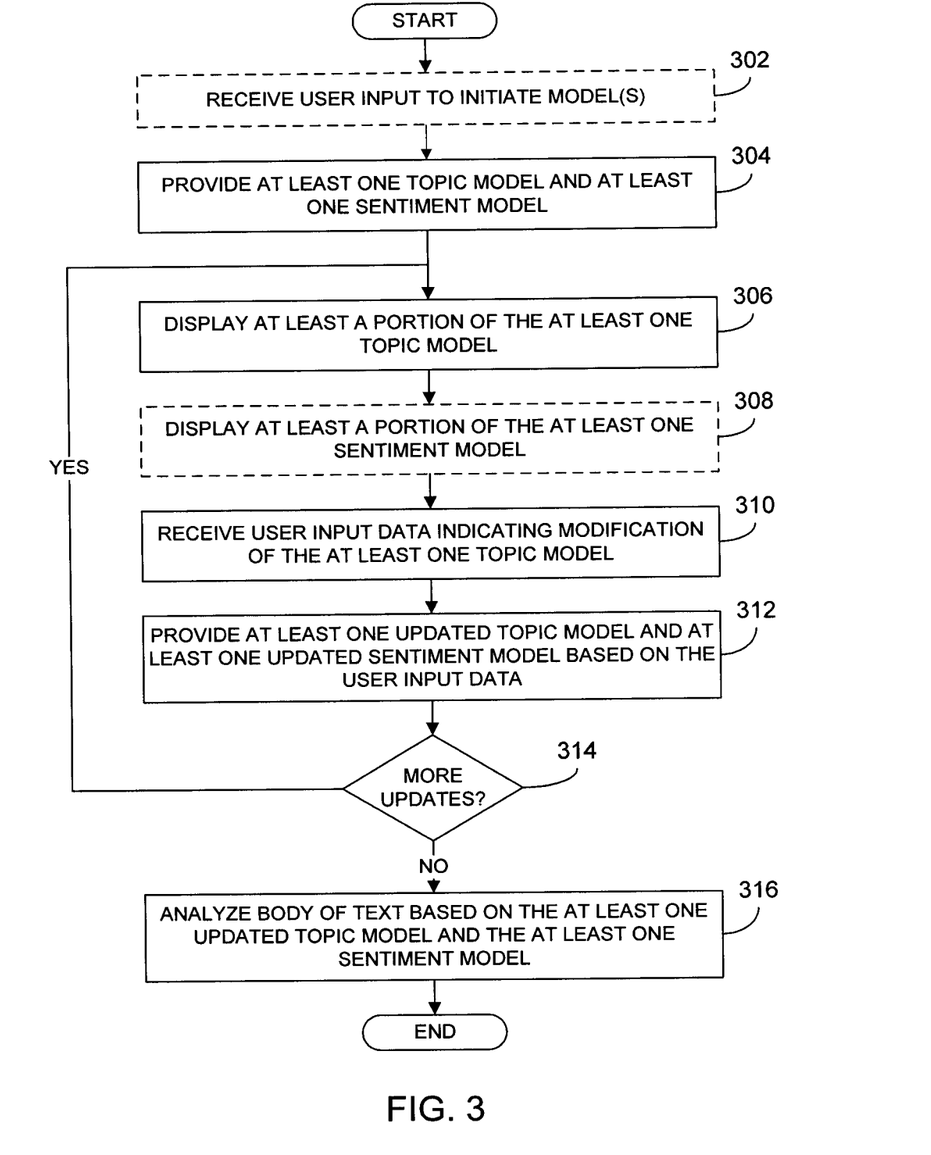
FIG. 3 is a flow chart illustrating processing in accordance with an embodiment of the instant disclosure.

Referring now to FIG. 3, a flow chart in accordance with the instant disclosure is further illustrated. As noted above, the processing illustrated in the flow chart of FIG. 3 may be implemented using the process device 100 of FIG. 1, and in particular, through the use of executable instructions 116 stored on the storage device 104 and subsequently executed by the processors 102.

Regardless, the illustrated processing begins at block 302 where user input data to initiate the topic and/or sentiment models may be optionally received. As described below relative to FIG. 4, the user input data received at block 302 may comprise designations of one or more initial topics as indicated by features (e.g., words) and associated probabilities used to initiate topic discovery. Likewise, features indicative of sentiment and associated probabilities may be received as the user input, which may be obtained (for example) from one or more external sentiment lexicons as known in the art. An example of this is illustrated in FIG. 4.

Figure 4:
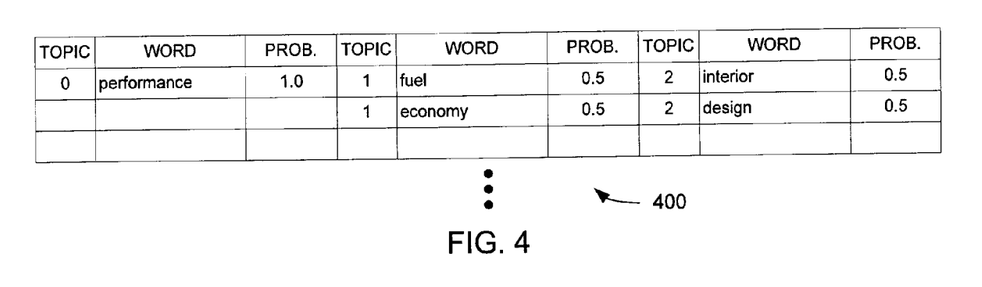
FIGS. 4-6 illustrate examples of a user interface that may be used for obtaining user input in accordance with various embodiments of the instant disclosure.

FIG. 4 illustrates an example of a user interface 400 in which three initial topics have been provided by a user. Techniques for implementing the user interface 400 (as well as the user interfaces 500, 600, 700 illustrated in FIGS. 5, 6 and 7, respectively), such as a graphical user interface, are well known in the art and need not be described in greater detail here. In particular, the user interface 400 may be used to establish initial topics upon which the generative model may determine the one or more topic models. For example, as illustrated in FIG. 4, the topic labeled "0" is initiated by providing a single word "performance" that is assigned a probability of 1 of belonging to that particular topic. Likewise, another topic labeled "1" is initiated using two words, "fuel" and "economy", each of which is assigned a probability of 0.5. Finally, as further illustrated, another topic labeled "2", is initiated using the words "interior" and "design", each of which is assigned a probability of 0.5. Note that, although not shown in FIG. 4, initial sentiment seed words and their probabilities (which may be imported from standard, external sentiment lexicons as noted above) may also be provided as part of the user interface 400. It is further noted that, although FIGS. 4-6 illustrate features as individual words, in practice, each feature may comprise a phrase or other n-grams including other linguistic or syntactic objects such as part of speech tags, as known in the art, without loss of generality of the instant description.

Referring once again to FIG. 3, processing continues at block 304 where at least one topic model and at least one sentiment model are provided according to a generative model for determining the topics and sentiments within a body of text. As further described above, the at least one topic model and at least one sentiment model will be optionally based on the user input received at block 302 or training data. In an embodiment, the generative model (as described, for example, in either the Mei Paper or the Lin Paper) may be provided with one or more known topics in the body of text such that topic models may be generated accordingly. In this embodiment, other, unknown topics may then be discovered through operation of the generative model. Thereafter, at block 306, at least a portion of the at least one topic model is displayed. An example of this is illustrated in FIG. 5. In particular, a user interface 500 is shown in which at least partial data constituting three topic models 502-506 are displayed. For example, the first topic model (labeled topic "0") comprises a number of words and their associated probabilities of belonging to that topic. Thus the word "performance" is assigned a relatively high probability of belonging to that topic, whereas a number of other words, e.g., "orient", "stellar", "optimum", "reliability", "steering", and "great" are each assigned relatively low probabilities. Likewise, various words and their respective probabilities are also shown for those topics models 504, 506 labeled "1" and "2". It is noted that only three topic models 502-506 are illustrated in FIG. 5 for ease of illustration; in practice, any desired number of topic models may be displayed and, for example, suitable display scrolling mechanisms as known in the art of user interfaces may be provided to view any desired topic model. Likewise, less than all of the words having non-zero probabilities within each topic model 502-506 are shown in FIG. 5 for ease of illustration. Once again, in practice, suitable scrolling mechanisms may be provided, thereby permitting a user to peruse all of the available data for a given topic model.

Referring once again to FIG. 3, processing may optionally continue at block 308 where at least a portion of the at least one sentiment model is also displayed. For example, the user interface 500 may also comprise a listing of words from the positive and negative sentiment models and the probabilities that those words belong to the respective models. Thereafter, at block 310, user input data indicating modification of the at least one topic model is received. As noted above, the user input may be received via any suitable user input device. An example of this is further illustrated with regard to FIG. 6.

Figure 5:
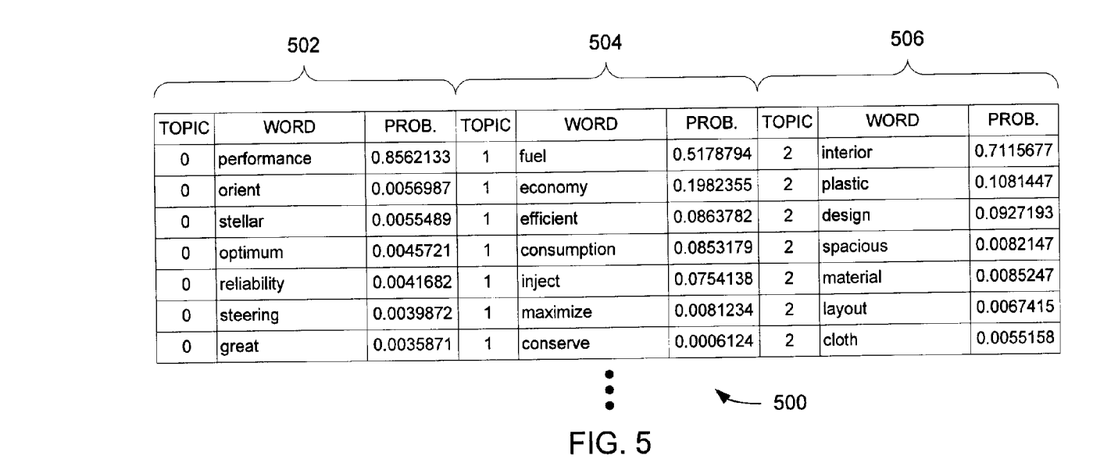
Figure 6:
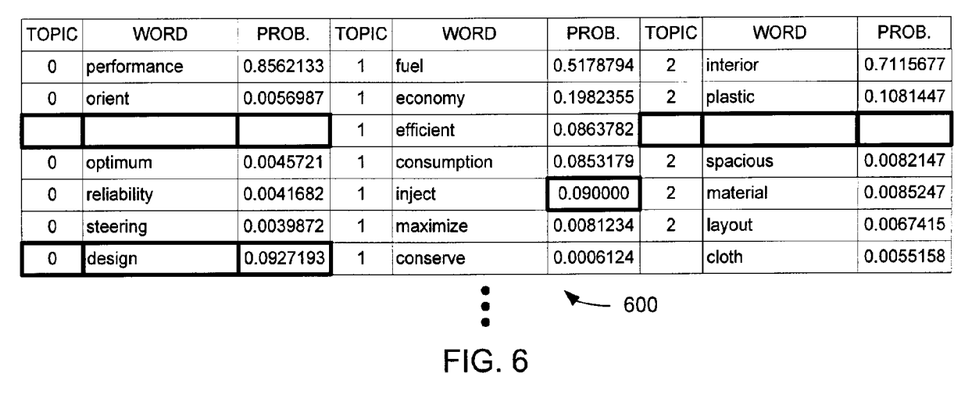

Referring now to FIG. 6 a user interface 600 is illustrated similar in appearance to the user interface 500 of FIG. 5. As shown, however, the user interface 600 captures a number of modifications (highlighted by the heavy lines) to the topic models previously illustrated in FIG. 5. For example, referring to topic "0", specific words from the previous iteration of the topic "0" topic model have been deleted. Specifically, the word "stellar" and the word "great" have been removed entirely. In the case of such deletions, this could be accomplished by removing the word and its probability entirely from the relevant topic model. However, in an alternative embodiment, rather than literally deleting the words from the topic models, deletion may be accomplished by setting the probability associated with that word within the topic model to an extremely low value; in this way, the word is effectively deleted in that its effect on the topic model has been minimized. Likewise, an entire topic may be deleted by treating all of its constituent words in this same fashion, i.e., deleting entirely or greatly minimizing all of the probabilities associated with its constituent words.

Another example of a suitable modification is illustrated with respect to the probability associated with the word "inject" for the topic model labeled topic "1". In particular, the probability associated with the word "inject" has been changed from the initial value illustrated in FIG. 5 of 0.0754138 to a new probability of 0.090000 as illustrated in FIG. 6. In yet another example, the word "design" under the topic model labeled topic "2" has been moved (e.g., using a "drag and drop" action known in the art of graphical user interfaces) to the topic model labeled topic "0". It is noted that, once again, the probability associated with the moved word may be altered as described above. Although not illustrated in FIG. 6, further examples of modifications may comprise the merging of two or more topic models into a single topic model, or the division of a single topic model into two or more topics. In the former, all of the words from given topic model (or a subset of the words with the remaining words being deleted) may be moved to another topic model thereby effectively merging the two topic models. In the latter, much like the embodiment illustrated in FIG. 4, a portion of the words and their associated probabilities with a given topic model could be selected and moved into a first new topic model, whereas the remainder of the words and their associated probabilities for the given topic model could be allowed to stay in that topic model, moved to an entirely new topic model or further sub-divided into additional, new topic models. Once again, the potential modifications described herein are merely illustrative examples and are not intended be exhaustive of the types of modification that could be performed. Furthermore, although not shown in FIG. 6, the sentiment models (when displayed) could also be modified in substantially the same manner as described above relative to the topic models.

Regardless of the particular user input data received at block 310, processing continues at block 312 where at least one updated topic model and at least one updated sentiment model based on user input data are provided. That is, the conditional probabilities for a given word within each of the associated topic models and/or sentiment models are updated in accordance with the modifications provided by the user input data, as described above. Once the updated models have been provided, processing continues at block 314 where it is determined whether further updates to any of the models are desired. This may be accomplished, for example, through the use of an appropriate user input mechanism in a user interface querying the user whether additional changes to the models are desired. If so, processing continues at block 306 where the now updated topic and/or sentiment models are displayed, followed by the above-described blocks 306-312. Further iterations of blocks 306-314 may continue as desired until the user indicates that further iterations are no longer needed. Alternatively, such multiple iterations could be controlled in an automatic or semi-automatic (i.e., providing suggestions to a user who then decides whether to continue). For example, a convergence condition could be specified such that further iterations are prevented (or suggested to discontinue) if no changes or only minimal changes in the probabilities of any existing model are detected.

Assuming no further updates are desired, processing continues at block 316 where the at least one updated topic model and the at least one updated sentiment model may be used to analyze the body of text. In an embodiment, the analysis performed at block 312 may be performed at any desired level of features. For example, the analysis may be performed on individual sentences or based upon paragraphs or even entire documents within the body of text. An example of the analysis results of this type are illustrated in FIG. 7. In particular, FIG. 7 illustrates a user interface 700 in which various sentences from the body of text 207 have been analyzed in accordance with the updated topic models and updated sentiment models. As shown, each sentence displayed within the user interface 700 is provided with a membership within a given topic, as well as the probability that the sentence belongs with that listed topic. For example, the membership indication in FIG. 7 may correspond to that topic model having the highest probability based on the analysis of that sentence. Although not shown in FIG. 7, the corresponding sentiment having the highest probability may also be displayed, thereby providing the user an indication of how the system interpreted the sentiment of the given feature (sentence, in this case).

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
providing, by a processing device implementing a generative model for determining topics and sentiments within text, at least one topic model and at least one sentiment model;
providing, by the processing device and for display, at least a portion of the at least one topic model;
receiving, by the processing device via a user input device operatively connected to the processing device, user input data,
the user input data indicating modification of the at least one topic model, and
the user input data indicating a new feature and associated feature probability corresponding to a topic; and
providing, by the processing device via the generative model, at least one updated topic model and at least one updated sentiment model based at least in part upon the user input data.

2. The method of claim 1, further comprising:
providing, by the processing device and for display, at least a portion of the at least one sentiment model.

3. The method of claim 1, where the user input data indicates a merger of at least two topics modeled by the at least one topic model.

4. The method of claim 1, where the user input data indicates division of a single topic modeled by the at least one topic model into two or more topics.

5. The method of claim 1, where the user input data indicates modification of a feature probability within a topic modeled by the at least one topic model.

6. The method of claim 1, where the user input data indicates deletion of a feature probability within a topic modeled by the at least one topic model.

7. The method of claim 1, where the user input data indicates moving a feature probability from a first topic to a second topic modeled by the at least one topic model.

8. The method of claim 1, where the user input data indicates deletion of a topic from the at least one topic model.

9. The method of claim 1, further comprising:
analyzing, by the processing device, target text constituting at least a portion of the text according to the at least one updated topic model and the at least one updated sentiment model.

10. The method of claim 1, further comprising:
receiving, by the processing device prior to providing the at least one topic model and the at least one sentiment model, user input data indicating a new feature and associated feature probability corresponding to an initial topic.

11. An apparatus comprising:
a memory to store instructions; and
a processor to execute the instructions to:
provide at least one topic model and at least one sentiment model based on a generative model for determining topics and sentiments within text;
provide, for display, at least a portion of the at least one topic model;

receive, via a user input device, user input data,
- the user input data indicating modification of the at least one topic model, and
- the user input data indicating a deletion of a feature probability within a topic modeled by the at least one topic model; and provide, via the generative model, at least one updated topic model and at least one updated sentiment model based at least in part upon the user input data.

12. The apparatus of claim 11, where the processor is further to:
provide, for display, at least a portion of the at least one sentiment model.

13. The apparatus of claim 11, where the user input data indicates a merger of at least two topics modeled by the at least one topic model.

14. The apparatus of claim 11, where the user input data indicates a division of a single topic modeled by the at least one topic model into two or more topics.

15. The apparatus of claim 11, where the user input data indicates a modification of a feature probability within a topic modeled by the at least one topic model.

16. The apparatus of claim 11, where the user input data indicates moving a feature probability from a first topic to a second topic modeled by the at least one topic model.

17. The apparatus of claim 11, where the user input data indicates a new feature and associated feature probability corresponding to a topic.

18. The apparatus of claim 12, where the user input data indicates a deletion of a topic from the at least one topic model.

19. The apparatus of claim 11, where the processor is further to:
analyze target text constituting at least a portion of the text according to the at least one updated topic model and the at least one updated sentiment model.

20. The apparatus of claim 11, where the processor is further to:
receive, prior to providing the at least one topic model and the at least one sentiment model, user input data indicative of a new feature and associated feature probability corresponding to an initial topic.

21. A non-transitory computer-readable medium storing instructions, the instructions comprising:
one or more instructions which, when executed by a processor, cause the processor to:
- provide at least one topic model and at least one sentiment model based on a generative model for determining topics and sentiments within text;
- provide, for display, at least a portion of the at least one topic model;
- receive, via a user input device, user input data,
  - the user input data indicating modification of the at least one topic model, and
  - the user input data indicating moving a feature probability from a first topic to a second topic modeled by the at least one topic model; and
- provide, via the generative model, at least one updated topic model and at least one updated sentiment model based at least in part upon the user input data.

22. The non-transitory computer-readable medium of claim 21, where the user input data indicates at least one of:
- a deletion of a feature probability within a topic modeled by the at least one topic model,
- a merger of at least two topics modeled by the at least one topic model,
- a division of a single topic modeled by the at least one topic model into two or more topics,
- a modification of a feature probability within a topic modeled by the at least one topic model,
- a new feature and associated feature probability corresponding to a topic, or
- a deletion of a topic from the at least one topic model.

* * * * *